United States Patent
Park et al.

(10) Patent No.: US 9,307,066 B1
(45) Date of Patent: Apr. 5, 2016

(54) MOBILE TERMINAL AND CONTROL METHOD FOR THE MOBILE TERMINAL

(71) Applicant: LG ELECTRONICS INC., Seoul (KR)

(72) Inventors: Wooseong Park, Seoul (KR); Daehwan Kim, Seoul (KR); Changkeun Choi, Seoul (KR); Gwanggoo Kang, Seoul (KR); Taewon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/657,064

(22) Filed: Mar. 13, 2015

(30) Foreign Application Priority Data

Sep. 16, 2014 (KR) ........................ 10-2014-0122872

(51) Int. Cl.
| | | |
|---|---|---|
| *H04M 1/00* | (2006.01) | |
| *H04M 1/725* | (2006.01) | |
| *H04W 4/02* | (2009.01) | |
| *H04W 88/02* | (2009.01) | |

(52) U.S. Cl.
CPC ............ *H04M 1/72522* (2013.01); *H04W 4/02* (2013.01); *H04W 88/02* (2013.01)

(58) Field of Classification Search
CPC .......... G06Q 10/109; H04M 1/72566; H04W 1/72522; H04W 4/02; H04W 88/02
USPC ............ 455/566, 412.1, 412.2, 9, 67.11, 567, 455/404.1, 418; 709/203, 204; 707/609, 707/724, 758; 345/174, 173; 705/7.18, 705/7.16, 7.19, 14.49; 715/769, 764, 771, 715/835; 701/117
See application file for complete search history.

(56) References Cited

U.S. PATENT DOCUMENTS

| | | | | |
|---|---|---|---|---|
| 6,668,177 | B2* | 12/2003 | Salmimaa | G06F 3/04817 455/456.3 |
| 8,112,299 | B2* | 2/2012 | Kim | G01C 21/362 701/414 |
| 8,723,811 | B2* | 5/2014 | Kim | G06F 3/0485 178/18.01 |
| 2008/0126991 | A1* | 5/2008 | Kang | H04M 1/72566 715/835 |
| 2008/0207274 | A1* | 8/2008 | Kim | H04M 1/72544 455/566 |
| 2008/0244005 | A1* | 10/2008 | Sengupta | H04L 12/581 709/204 |
| 2009/0113296 | A1 | 4/2009 | Lacy et al. | |
| 2010/0146384 | A1 | 6/2010 | Peev et al. | |
| 2010/0248689 | A1 | 9/2010 | Teng et al. | |
| 2010/0325194 | A1* | 12/2010 | Williamson | H04W 4/02 709/203 |

(Continued)

FOREIGN PATENT DOCUMENTS

DE     10-2005-020155     11/2006

OTHER PUBLICATIONS

European Patent Office Application Serial No. 15162136.4, Search Report dated Feb. 4, 2016, 8 pages.

*Primary Examiner* — Tan H Trinh
(74) *Attorney, Agent, or Firm* — Lee, Hong, Degerman, Kang & Waimey

(57) ABSTRACT

Disclosed are a mobile terminal to which a touch input is applicable, and a control method thereof. The mobile terminal includes: a terminal body; a wireless communication unit configured to receive position information on the terminal body; and a controller configured to extract one or more schedules stored in the terminal body, to acquire azimuth information on positions related to the extracted schedules based on the received position information, and to output one or more icons related to the extracted schedule(s) to an edge region of the display unit, wherein when a tilted state of the terminal body is sensed, the controller controls the one or more icons to move along the edge region of the display unit, based on azimuth information changed according to a sensed gradient.

19 Claims, 16 Drawing Sheets

(56) References Cited

U.S. PATENT DOCUMENTS

| | | | | |
|---|---|---|---|---|
| 2010/0330972 A1* | 12/2010 | Angiolillo | H04M 1/274583 | 455/418 |
| 2012/0066629 A1* | 3/2012 | Lee | G06F 3/04847 | 715/769 |
| 2013/0050143 A1* | 2/2013 | Kim | G06F 3/0488 | 345/174 |
| 2013/0318437 A1* | 11/2013 | Jung | G06F 3/0488 | 715/251 |
| 2013/0339140 A1* | 12/2013 | Pokorny | G06Q 30/0242 | 705/14.49 |
| 2014/0026088 A1 | 1/2014 | Monte | | |
| 2014/0358411 A1* | 12/2014 | Khoe | G08G 1/13 | 701/117 |
| 2015/0185947 A1* | 7/2015 | Tsai | G06F 3/0488 | 345/173 |

* cited by examiner

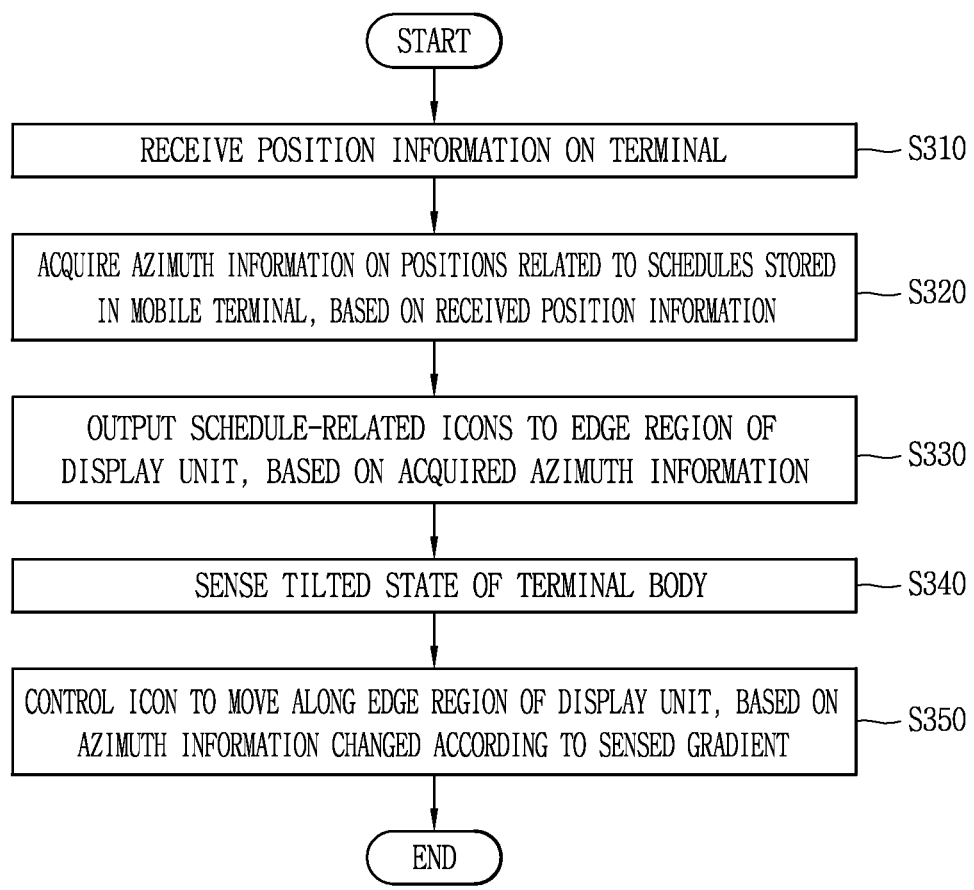

FIG. 9A(a)
FIG. 9A(b)
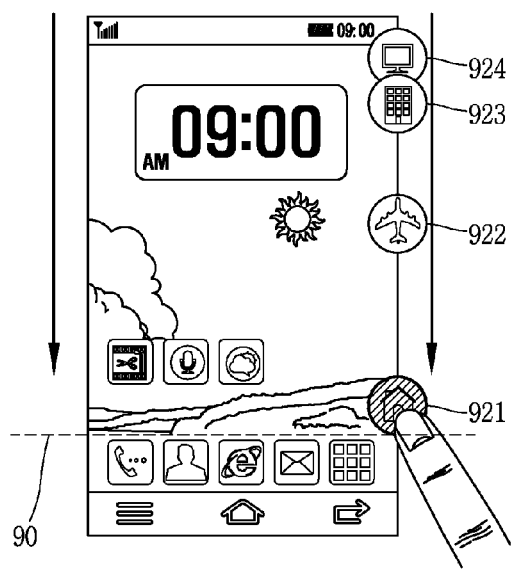
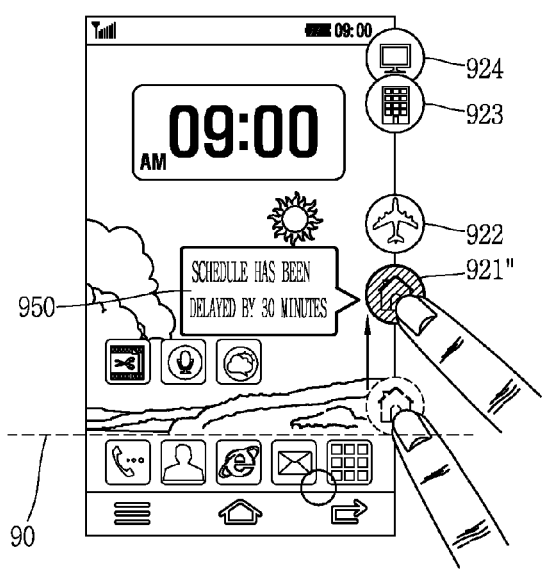

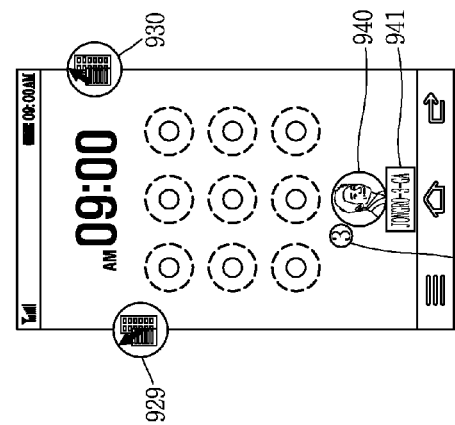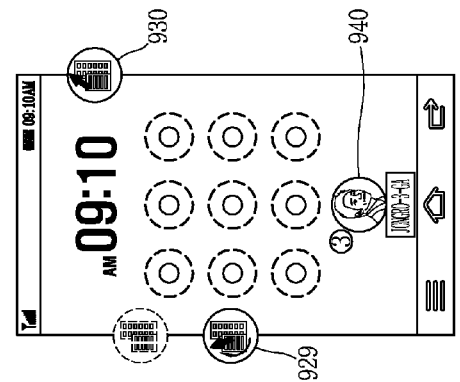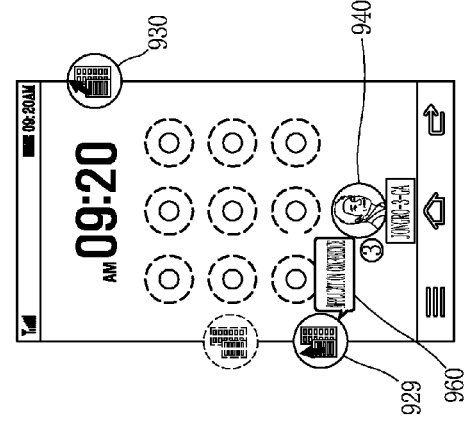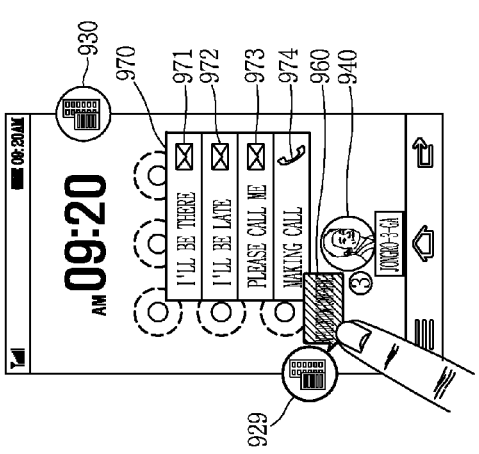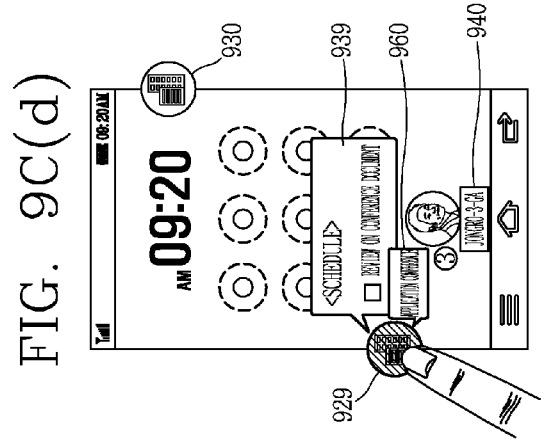

MOBILE TERMINAL AND CONTROL METHOD FOR THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0122872, filed on Sep. 16, 2014, the contents of which is incorporated by reference herein in its entirety.

BACKGROUND OF THE DISCLOSURE

1. Field of the Disclosure

This specification relates to a mobile terminal to which a touch input is applicable, and a control method thereof.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

The mobile terminal may store information on one or more schedules through a user input. In this case, in order to check positions related to the stored schedules, a user should release a locked state of the mobile terminal, and then execute a schedule application so as to check a position related to a specific schedule. Then, the user should execute a map application so as to display the checked position on a map screen, etc. Such complicated steps may cause a user's inconvenience.

SUMMARY OF THE DISCLOSURE

Therefore, an aspect of the detailed description is to provide a mobile terminal capable of intuitively displaying schedule-related positions based on a current position thereof, without undergoing a plurality of steps for checking positions related to stored schedules, and a control method thereof.

Another aspect of the detailed description is to provide a mobile terminal capable of intuitively displaying a remaining time until a scheduled time based on a current time, and a control method thereof.

To achieve these and other advantages and in accordance with the purpose of this specification, as embodied and broadly described herein, there is provided a mobile terminal, including: a terminal body; a wireless communication unit configured to receive position information on the terminal body; and a controller configured to extract one or more schedules stored in the terminal body, to acquire azimuth information on positions related to the extracted schedules based on the received position information, and to output one or more icons related to the extracted schedule(s) to an edge region of the display unit, wherein when a tilted state of the terminal body is sensed, the controller controls the one or more icons to move along the edge region of the display unit, based on azimuth information changed according to a sensed gradient.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 3 is a flowchart for explaining an operation method of a mobile terminal according to an embodiment of the present invention;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
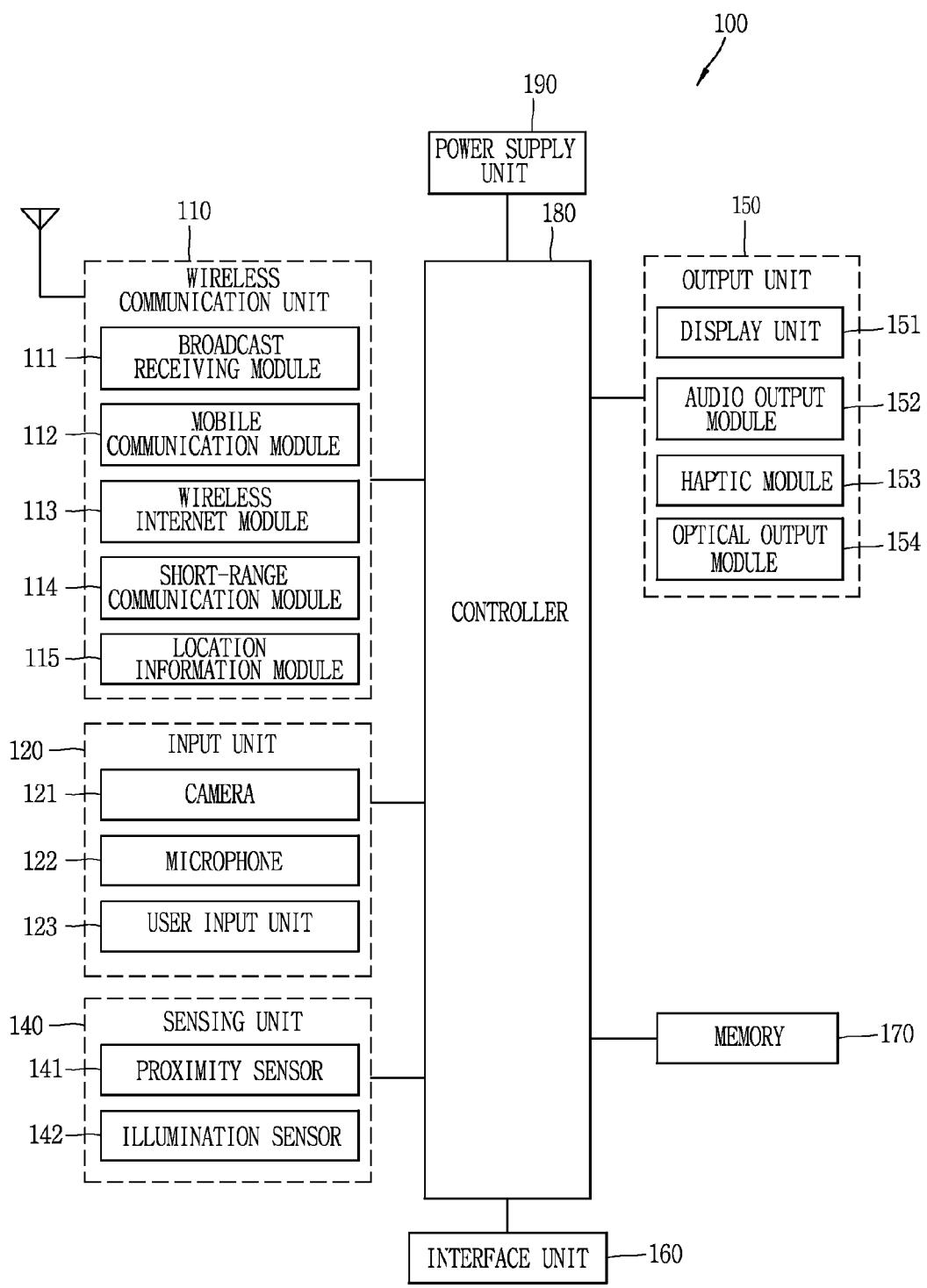
FIG. 1A is a block diagram of a mobile terminal according to an embodiment of the present invention.
Figure 1B:
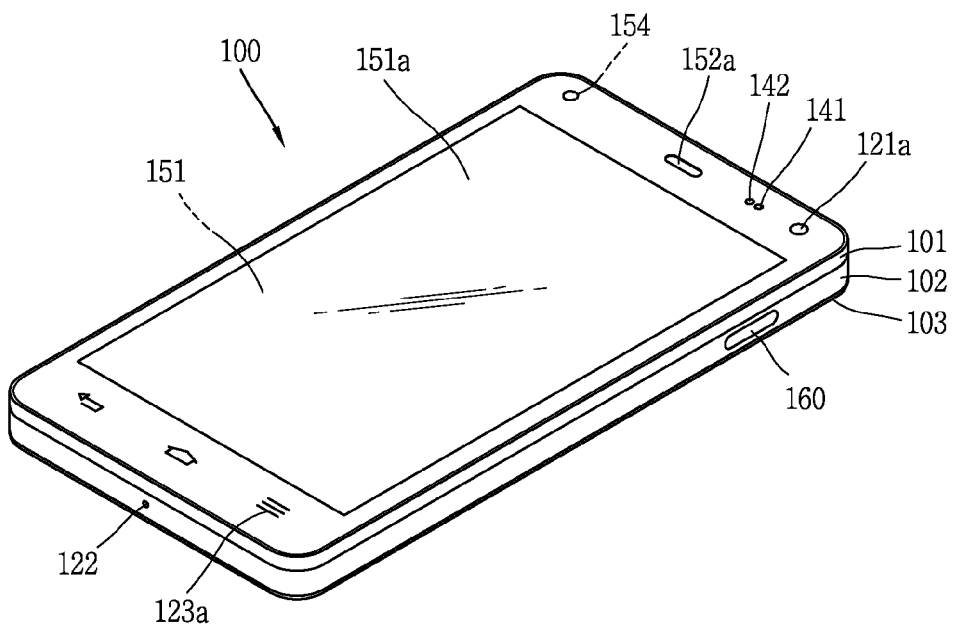
FIGS. 1B and 1C are views illustrating a mobile terminal according to the present invention, which are viewed from different directions.
Figure 1C:
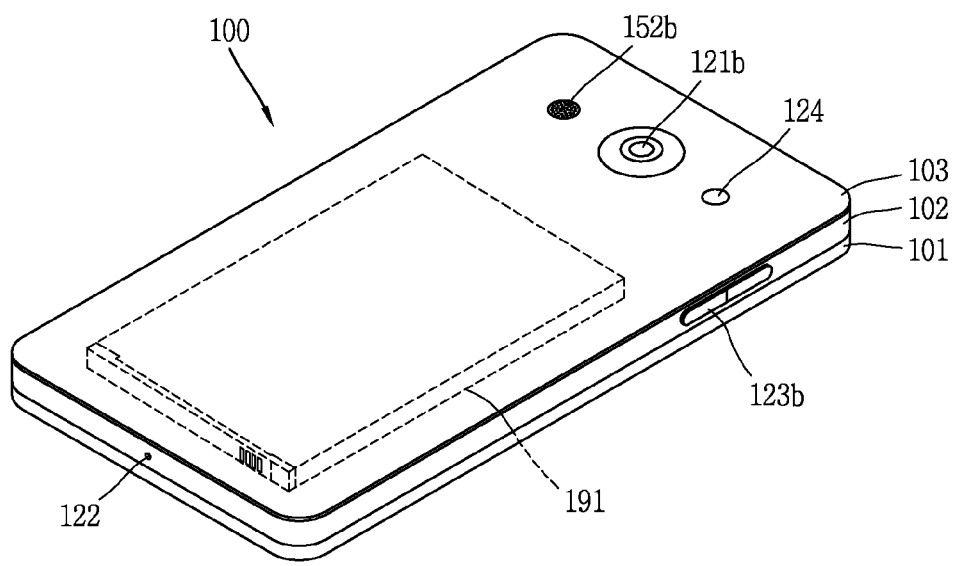

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The controller 180 of the mobile terminal according to an embodiment of the present invention, which can include at least one of the aforementioned components, may receive position information of the mobile terminal through the wireless communication unit 110. And the controller 180 may acquire azimuth information indicating positions related to one or more schedules pre-stored in the mobile terminal, based on the received position information. Then, the controller 180 may output one or more schedule-related icons on an edge region of the display unit 151, based on the acquired azimuth information. Upon sensing of a tilted state of the mobile terminal, the controller 180 controls the icons to move along the edge region of the display unit 151, based on azimuth information changed according to the sensed gradient. This may allow a user to intuitively check a direction of a schedule-related place on the display unit 151, based on a current position of the mobile terminal.

The 'edge region' of the display unit 151 is an inner region of the display unit 151 formed along a circumferential region of a front surface of the display unit 151, which may mean a circumference having a predetermined thickness. Alternatively, the 'edge region' of the display unit 151 may mean a boundary region between the display unit 151 and a bezel portion (not shown) formed along an edge of a front surface of the display unit 151. Still alternatively, the 'edge region' of the display unit 151 may mean a boundary region among four surfaces, except for a status display region output to an upper end of the display unit 151 and indicating a status of the mobile terminal, and except for a key input unit (e.g., a home key) output to a lower end of the display unit 151.

Outputting schedule-related icons to the edge region of the display unit 151 may mean that schedule-related icons are displayed on one of an upper end, a lower end, a left end, a right end and each corner of the display unit 151.

In the drawings of the present invention, schedule-related icons have been displayed out of the display unit 151 for convenience. However, the edge region of the display unit 151 means an inner region of the display unit 151.

Hereinafter, a method of outputting schedule-related icons will be explained in brief, and a method of checking schedule-related information using icons displayed on the edge region of the display unit 151 will be explained in more detail.

FIGS. 2(a) to 2(d) are views illustrating a method of outputting schedule-related icons in a mobile terminal according to an embodiment of the present invention.

Figure 2A:
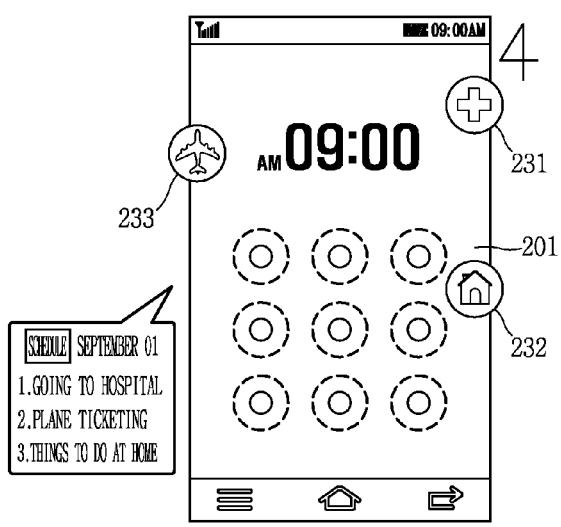
FIGS. 2(a) to 2(d) illustrate conceptual views for explaining an operation implemented by the present invention.

Referring to FIG. 2(a), when a screen of the display unit 151 is in an 'ON' state, a lock screen 201, corresponding to a locked state where input of a control command with respect to an application is restricted, may be output to the display unit 151. The lock screen 201 may include a lock-state releasing region at a central portion thereof, the lock-state releasing region where a touch for releasing a locked state of the mobile terminal is input. Although not shown, a home screen, where icons of applications installed at the mobile terminal are displayed, may be output to the display unit 151.

Under such state, the controller 180 may output one or more schedule-related icons to the edge region of the display unit 151.

The schedule includes information on times and/or places preset by a user, and means information registered to a scheduling calendar installed at the mobile terminal 100.

The information may be registered by a user input, or may be automatically registered after being extracted from a message stored in the mobile terminal 100 (e.g., an SMS text message, an e-mail, a chatting record file using an SNS, etc. For instance, the information may include schedule content, a schedule execution time, a schedule-related place, and a schedule-related person.

For this, the controller 180 may extract one or more schedules stored in the mobile terminal 100, and may generate one or more icons based on information related to the extracted schedules. In this case, the controller 180 may control only a schedule or schedule-related information which satisfies a preset condition, to be extracted. For instance, the controller 180 may control only a schedule or schedule-related information which has been pre-displayed on a scheduling calendar, to be extracted.

In a case where a position or a place related to the extracted schedule has been stored, the controller 180 may detect the position or the place. Then the controller 180 may acquire azimuth information indicating a position or a place related to the detected schedule, based on a current position of the mobile terminal. For instance, if a current position of the mobile terminal is 'Sillim 2-dong' and a position related to an extracted schedule is 'Munjeong 2-dong', the controller 180 may acquire azimuth information indicating that a schedule-related position is the North East.

Referring to FIG. 2(a) back, schedule-related icons 231, 232 and 233 are displayed on the edge region of the display unit 151 in a floated manner, which may be representative images indicating corresponding schedules.

More specifically, images of icons floated on the edge region of the display unit 151 may correspond to at least one of a position, a specific person and a time each related to an extracted schedule. The number of icons floated on the edge region of the display unit 151 may be determined in proportion to the number of extracted schedules.

For instance, a first icon 231 related to a hospital schedule is displayed as a 'cross' image, a second icon 232 related to a home schedule is displayed as a 'home' image, and a third icon 233 related to an airport schedule is displayed as an 'airplane' image. Each of the illustrated icons has a circular shape. However, the present invention is not limited to this. That is, the icons may have any shape which can be displayed on the edge region of the display unit 151. For instance, the circular shape may be replaced by an arrow, a quadrangular shape, etc. As another example, as a long touch input is applied to the floated icons, the controller 180 may enter an edition mode to change the images of the icons into other images.

Positions of the icons 231, 232 and 233 indicate schematic azimuths of corresponding schedules. For this, it may be defined that, on the edge region of the display unit 151, a left side indicates the East, a right side indicates the West, an upper end indicates the North, and a lower end indicates the South. Alternatively, it may be defined that a central region of the display unit 151 is a virtual reference line, an upper region indicates the North, and a lower region indicates the South.

For instance, the first icon 231 indicates that a position of a reserved hospital is the North-North-East based on a current position of the mobile terminal, and the second icon 232 indicates that a position of a home is the North-East based on a current position of the mobile terminal. And the third icon 233 indicates that a position of an airport is the North-West based on a current position of the mobile terminal. This seems as if places related to schedules to be executed next time were schematically displayed on the display unit 151 regarded as a virtual map. Accordingly, a user can efficiently make a plan for executing next schedules based on the arrangement of the icons.

As shown in FIG. 2(a), if a screen of the display unit 151 is turned on, icons may be immediately arranged on the edge region of the display unit 151. In a case where a specific key has been input in a locked state, icons may be arranged on the edge region of the display unit 151. Whether to display such schedule-related icons on the display unit 151 or not may be determined by a user's setting.

In a state where schedule-related icons have been output to the edge region of the display unit 151, the sensing unit 140 of the mobile terminal may sense a gradient and a gradient direction of the mobile terminal. The controller 180 may re-calculate azimuth information about a schedule-related position, based on the sensed gradient and gradient direction. Then the controller 180 may control icons to move along the edge region of the display unit 151, based on the re-calculated azimuth information.

That is, the controller 180 may rearrange schedule-related icons not only in a case where a position of the mobile terminal has been changed, but also in a case where only a gradient of the mobile terminal has been changed.

Figure 2B:
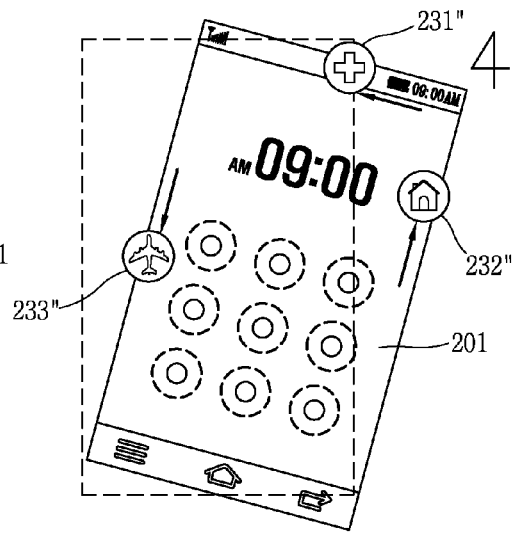
Figure 2D:
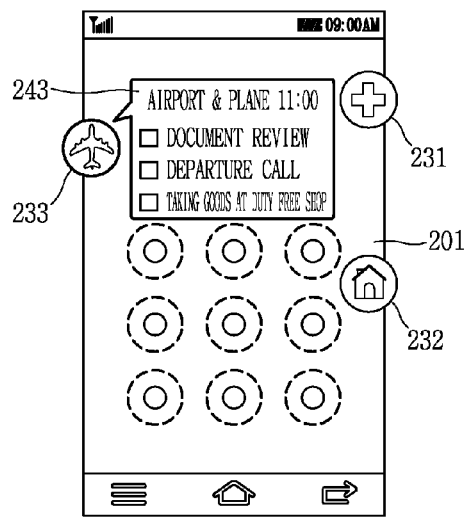

For instance, as shown in FIG. 2(b), if a user tilts the mobile terminal to the right by a predetermined gradient value, the controller 180 may move the icons arranged on the edge region of the display unit 151 to a direction opposite to the tilted direction, by the gradient value, so as to maintain the existing azimuth information shown in FIG. 2(a). Accordingly, the first icon 231 is moved to a left direction by the gradient value (231"), the second icon 232 is moved to an upper direction by the gradient value (232"), and the third icon 233 is moved to a lower direction by the gradient value (233").

Thus, if a user tilts or rotates the mobile terminal, azimuth information fixed based on a current position of the mobile terminal is displayed.

Figure 2C:
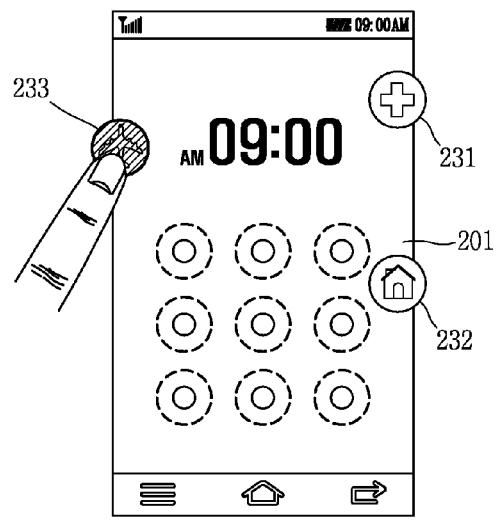

If a touch input is applied to one (233) of the schedule-related icons 231, 232 and 233 floated on the edge region of the display unit 151 as shown in FIG. 2(c), a schedule preview screen 243 is popped-up around the selected icon 233.

The schedule-preview screen 243 may include position information, time information and schedule content each related to schedules stored in the mobile terminal. Each of the schedule content may include a check box indicating whether a schedule has been checked or not (e.g., a box image). If a large amount of content is included in the schedule preview screen 243, the schedule preview screen 243 is scrolled to one direction so as to have a changed output range.

Although not shown, if a preset touch input (e.g., a long touch input or a long press touch input) is applied to the popped-up schedule preview screen 243, a locked state of the mobile terminal may be converted into a released state, and an application related to the popped-up schedule preview screen 243 may be executed.

A released state of the mobile terminal may mean that a locked state with respect to some applications is released. For instance, a locked state with respect to some applications for receiving detailed information on schedules, e.g., a scheduling calendar, a specific SNS application, a camera application, a map application, etc., may be released.

Under such configuration, can be solved a user's inconvenience to firstly release a locked state of the mobile terminal so as to execute an entire screen viewing function with respect to the popped-up schedule preview screen 243, and then to execute a related application.

On the other hand, if a touch input (e.g., a short touch input or a short press touch input) is applied to one point on the lock screen 201 rather than the popped-up schedule preview screen 243, or if a predetermined time has lapsed, the popped-up schedule preview screen 243 disappears.

As aforementioned, the mobile terminal of the present invention may output schedule-related icons to the edge region of the display unit, by acquiring azimuth information about positions related to schedules stored in the mobile terminal, based on a current position of the mobile terminal. Especially, as the schedule-related icons floated on the edge region of the display unit move based on azimuth information changed whenever a gradient of the mobile terminal is changed, azimuths of schedule-related positions are intuitively displayed. Further, a user may be immediately provided with schedule information even in a locked state of the mobile terminal, by using a touch input applied to an icon.

FIG. 3 is a flowchart for explaining an operation method of a mobile terminal according to an embodiment of the present invention.

Firstly, the mobile terminal 100 according to an embodiment of the present invention may receive position information of the terminal body, through the wireless communication unit 110 (S310).

Specifically, the wireless communication unit may receive position information of the terminal body, using a global positioning system (GPS) or a Wi-Fi positioning system (WPS) among positioning techniques.

The GPS means a system for receiving GPS (Global Positioning System) information of the terminal body, from a satellite that goes around the Earth. That is, the wireless communication unit 110 may receive position information of the terminal body, based on latitude information and longitude information received from the GPS. The WPS means a system for determining a position of the terminal body based on virtual access point (AP) database (DB) information acquired through war-driving, and based on wireless local area network (WLAN) AP information received from the mobile terminal 100. That is, the wireless communication unit 110 may acquire position information of the terminal body, based on a triangulation method based on a position of an access point (AP) of Wi-Fi.

Then the controller 180 of the mobile terminal 100 may acquire azimuth information on positions of schedules stored in the mobile terminal, based on the position information received through the wireless communication unit 110 (S320).

The schedules stored in the mobile terminal may include plans registered to a scheduling calendar installed at the mobile terminal 100, other persons, places (positions), etc. Thus, positions related to schedules stored in the mobile terminal mean places related to scheduled plans.

For instance, in a case where an appointment in 'XX' hospital at 2:00 PM today has been registered to a scheduling calendar, the 'XX' hospital corresponds to a schedule-related place. Then the controller 180 may collect azimuth information on a place where the 'XX' hospital is located, based on a current position of the mobile terminal received from the wireless communication unit 110.

Then the controller 180 may generate schedule-related icons and output the generated icons to the edge region of the display unit 151, based on the acquired azimuth information (S330).

An image of the icon may be information registered to a scheduling calendar, e.g., another person's facial image with respect to a scheduled plan, an image indicating a place in an intuitive manner, or a text indicating a time of a scheduled plan. The number of icons to be generated may be determined in proportion to the number of schedules registered to a scheduling calendar.

In the present invention, the icons have a circular shape. However, the present invention is not limited to this. That is, the circular shape may be replaced by at least one of an arrow, a quadrangular shape, a place-related image, and a speech balloon (in this case, acquired azimuth information can be indicated more precisely).

The controller 180 may preset an output condition of generated schedule-related icons.

More specifically, in an activated state (ON' state) of the display unit 151, if a specific key of the mobile terminal is pushed or a touch input applied to a specific region of the display unit 151 is sensed, the controller 180 may control schedule-related icons to be displayed on the edge region of the display unit 151. In a case where an output condition of icons has been preset, if a specific key of the mobile terminal is pushed or a touch input applied to a specific region of the display unit 151 is re-sensed, in a state where schedule-related icons have been output to the edge region of the display unit 151, the controller 180 may control the output icons to disappear.

A position of an icon output to the display unit 151 indicates an approximate direction of a place related to a corresponding schedule. That is, a left edge region of the display unit 151 indicates a west direction, and a right edge region of the display unit 151 indicates an east direction. An upper edge region of the display unit 151 indicates a north direction, and a lower edge region of the display unit 151 indicates a south direction.

For instance, if an icon has been output to an upper end of the display unit 151, the mobile terminal may recognize that a schedule-related place is located in the east based on a current position of the mobile terminal. As another example, if an icon has been output to a left lower side of the display unit 151, the mobile terminal may recognize that a schedule-related place is located in the south-west based on a current position of the mobile terminal.

In the present invention, since schedule-related icons are displayed along the edge region of the display unit 151, the mobile terminal can allow a user to intuitively recognize a direction of a place related to a next schedule from a current position, with minimizing a blocked state of a screen output to the display unit 151.

The mobile terminal 100 may sense a gradient and a gradient direction of the mobile terminal 100, using the sensing unit 140 (S340).

Specifically, the sensing unit 140 may include a motion recognition sensor (not shown) configured to sense a motion of the body. The motion recognition sensor (not shown) may be mounted in the mobile terminal 100, and may recognize a motion of the mobile terminal 100. The motion recognition sensor (not shown) may include at least one of a terrestrial magnetism sensor, a gyro sensor and an acceleration sensor.

The motion recognition sensor (not shown) may sense whether the body has been tilted or not, a gradient value and a gradient direction. That is, the motion recognition sensor (not shown) may sense a displacement of the mobile terminal due to a tilted state of the terminal body, i.e., a gradient direction and a gradient angle, and may generate an electric signal based on the sensing. The motion recognition sensor (not shown) may become activated when a schedule-related icon has been output to the edge region of the display unit 151.

Upon sensing of a tilted state of the mobile terminal, the controller 180 may control icons output to the display unit 151 to move along the edge region of the display unit 151, based on azimuth information changed according to a direction of a sensed gradient.

That is, whenever a tilted state of the mobile terminal is sensed, the controller 180 may control schedule-related icons output to the edge region of the display unit 151 to move in proportion to a gradient direction and a gradient degree, in order to fix directions indicated by the icons. In this case, an animation effect to provide icons floated on the water can be implemented.

Figure 4A:
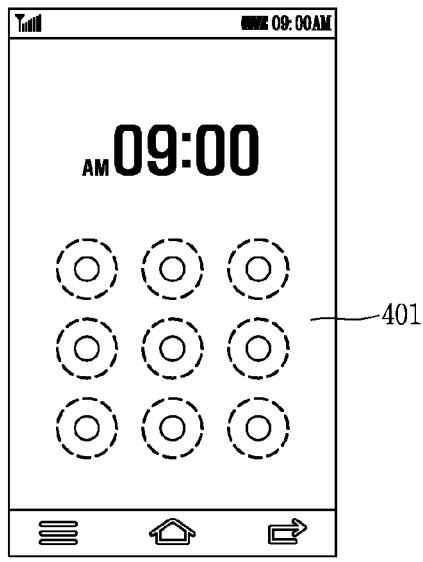
FIGS. 4(a) to 4(c) illustrate conceptual views for explaining a method of displaying schedule-related icons in a position based manner, in a mobile terminal according to an embodiment of the present invention.
Figure 4B:
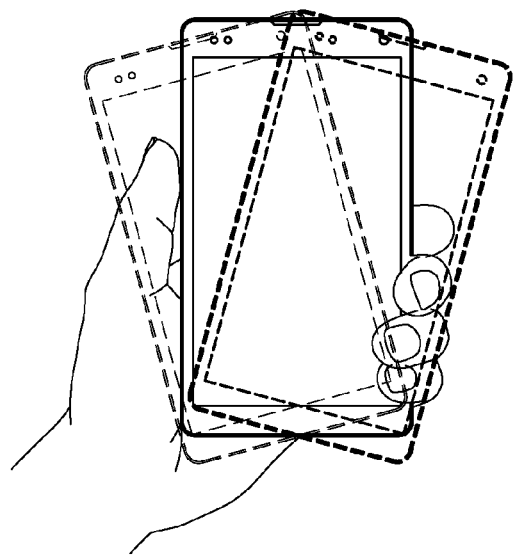

FIGS. 4(*a*) to 4(*c*) illustrate conceptual views for explaining a method of displaying schedule-related icons in a position based manner, in a mobile terminal according to an embodiment of the present invention.

Once the display unit 151 of the mobile terminal 100 is activated, a lock screen 401, corresponding to a locked state where input of a control command with respect to an application is restricted, may be output to the display unit 151. Although not shown, the locked state may be implemented when a user pushes a preset specific key (e.g., hold key) of the mobile terminal 100.

The lock screen 401 may include a lock-state releasing region where a touch for releasing a locked state of the mobile terminal is input. For instance, if a plurality of touch inputs, applied to a locked-state releasing region output to a central part of the lock screen 401, matches a preset pattern, a locked state of the mobile terminal may be converted into a released state. And a release screen corresponding to a released state (e.g., a home screen, or an execution screen of a recently-executed application) may be output to the display unit 151.

In a state where a lock screen has been output to the display unit 151, upon sensing of a preset gesture (e.g., a gesture to move the terminal body by a value more than a reference value, as shown in FIG. 4(*b*)), the controller 180 may output schedule-related icons 421, 422, 423 and 424 to the edge region of the display unit 151. The reference value, a threshold value indicating the number of times that the terminal body is moved right and left, may be set as 3 or more, such that the mobile terminal recognizes a user's motion to move the terminal body as an intentional input of a control command.

Points, where the icons 421, 422, 423 and 424 have been arranged, indicate schedule-related places.

A current position of the mobile terminal may correspond to a fixed position on the mobile terminal, e.g., a home key 130*a*. In this case, even if a gradient of the mobile terminal is sensed, positions of icons output to the display unit 151 may be fixed. That is, since a current position of the mobile terminal is always fixed to the specific position 130*a*, icons are arranged on the edge region of the display unit 151 based on the specific position 130*a*. Thus, the controller 180 needs not re-calculate schedule-related azimuth information whenever the mobile terminal is moved. Rather, the controller 180 has only to calculate schedule-related azimuth information, based on a current position of the mobile terminal.

Figure 4C:
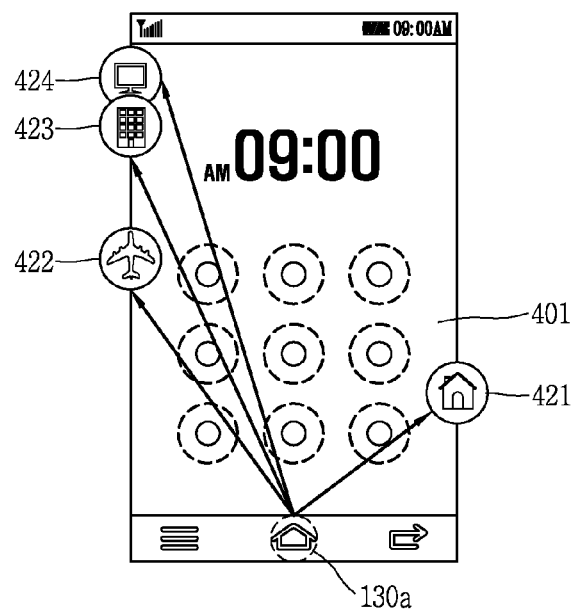

For instance, if a current position of the mobile terminal has not changed, as shown in FIG. 4(c), the first icon 421 indicating the East is output to a right edge region of the display unit 151, and the second to fourth icons 422, 423 and 424 indicating the North are output to a left edge region of the display unit 151. In a case where positions of a plurality of schedule-related icons are close to each other, some of the plurality of icons (e.g., the third and fourth icons 423 and 424) may be displayed in an overlapped manner. Although not shown, in a case where information on schedules stored in the mobile terminal does not include place (position) information, an icon may be output to the edge region of the display unit 151, or may be output in a shape (e.g., box shape) differentiated from other icons.

A user may reset a schedule order based on positions of the schedule-related icons 421, 422, 423 and 424. In a case where positions of a plurality of schedule-related icons are close to each other, a user may consecutively perform a schedule corresponding to the third icon 423, and a schedule corresponding to the fourth icon 424. This can enhance efficiency of a traffic line (moving line).

Hereinafter, a method of executing one or more related functions using a selected schedule-related icon will be explained with reference to FIGS. 5(a) to 5(d).

Figure 5A:
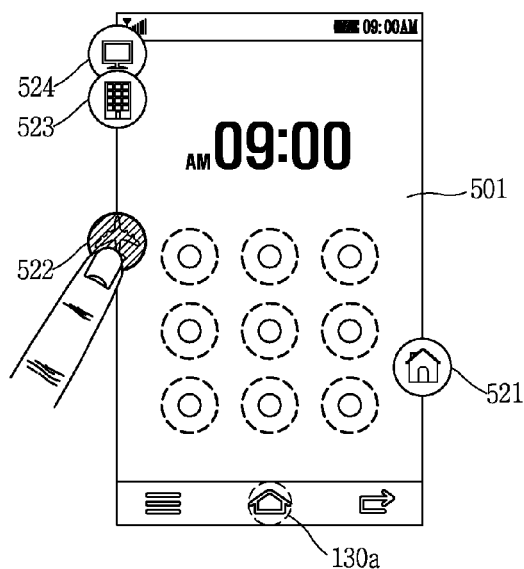
FIGS. 5(a) to 5(d) illustrate conceptual views for explaining a method of executing one or more functions related to a selected schedule, in a mobile terminal according to an embodiment of the present invention.

As shown in FIG. 5(a), a lock screen corresponding to a locked state of the mobile terminal is output to the display unit 151, and schedule-related icons 521, 522, 523 and 524 are floated on the edge region of the display unit 151. In this state, as shown in FIG. 5(b), the mobile terminal may sense that a touch input applied to the specific icon 522 on the edge region is dragged to a preset region on a lock screen (e.g., a central region of the display unit 151) to thus be released.

Figure 5B:
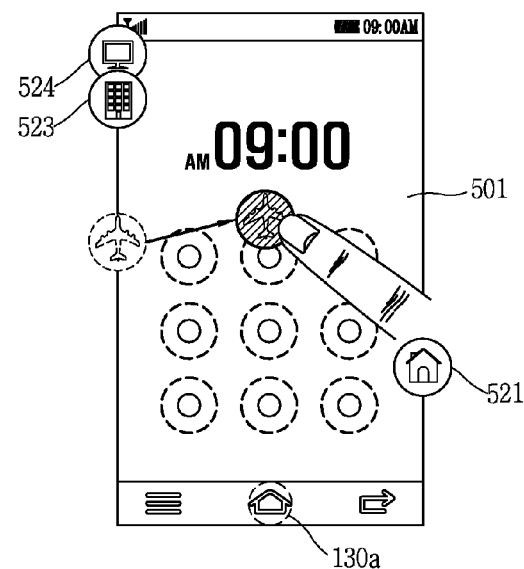
Figure 5D:
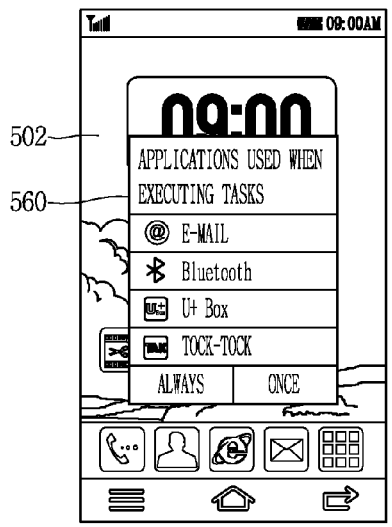
Figure 5C:
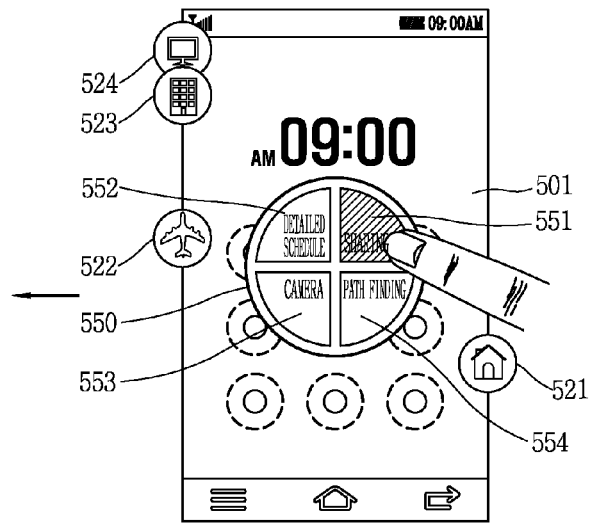

As shown in FIG. 5(c), the controller 180 may output a menu screen 550 for executing one or more functions related to a schedule corresponding to the dragged icon, to a preset region of the display unit 151 (e.g., a central region) when the drag input is released.

As shown in FIG. 5(c), the menu screen 550 may be a circular image divided into a plurality of regions and displaying a text indicating a related function at each region. The plurality of regions of the menu screen 550 may include an 'information sharing region' 551 with respect to the selected icon 522, a 'detailed schedule viewing region' 552, a 'camera (AR: augmented reality) viewing region' 553, a 'route search region' 554, etc.

As shown in FIGS. 5(b) and (c), the controller 180 may control icons to move along a path of a drag input, and may control the icons to return to the edge region of the display unit 151 when the drag input is released. The popped-up menu screen 550 may disappear when a touch input is sensed on a background screen where icons have not been output.

As shown in FIG. 5(c), when a touch input is sensed on one region of the popped-up menu screen 550, e.g., the 'information sharing region' 551, the controller 180 may convert a locked state of the mobile terminal into a released state.

The released state means a state where a user's input of a control command with respect to some applications is not restricted. That is, the released state may mean that a locked state of the mobile terminal is converted into a released state with respect to only an application related to a selected region.

Once the 'information sharing region' 551 is selected, the controller 180 may control an application related to an information sharing function, to be executed with respect to a schedule corresponding to the selected icon 522. As a result, as shown in FIG. 5(d), the mobile terminal may transmit information on a schedule corresponding to the selected icon 522, e.g., an airplane boarding time, things to do at an airport, etc., to another mobile terminal, via e-mail, SNS application, Bluetooth, etc.

FIGS. 6(a) to 6(d) illustrate conceptual views for explaining various examples to output a schedule preview screen of a selected icon, using a touch input applied to the icon, in a mobile terminal according to an embodiment of the present invention.

Figure 6A:
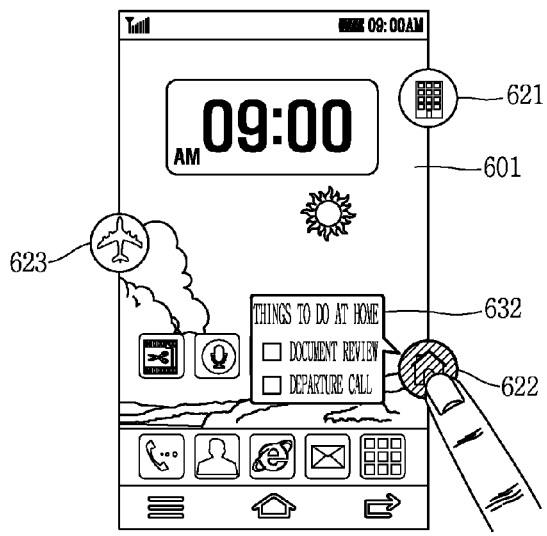
FIGS. 6(a) to 6(d) illustrate conceptual views for explaining a method of outputting a schedule preview screen of a selected schedule, in a mobile terminal according to an embodiment of the present invention.

As shown in FIG. 6(a), once a home screen 601 is output to the display unit 151, schedule-related icons 621, 622 and 623 may be floated on the edge region of the display unit 151.

If a touch input is applied to one of the schedule-related icons 621, 622 and 623, a schedule preview screen 632 corresponding to the selected icon 622 is output to a region adjacent to the selected icon 622. The touch input may be a proximity touch having a duration time less than a reference time, or a single touch (tap touch).

If a reference time lapses in a state where the schedule preview screen 632 has been output, the output schedule preview screen 632 disappears. If a touch input applied to the schedule preview screen 632 is sensed, information on the schedule is output to an entire region of the display unit 151. That is, an execution screen of an application related to the schedule (e.g., scheduling calendar) is immediately displayed.

When a drag input connected from one of a left side and a right side of the edge region of the display unit 151 to another is applied to an icon, the controller 180 may control a schedule preview screen related to the icon to be output to be fixed to said another. That is, the controller 180 may control an output schedule preview screen to continuously float on the display unit 151, by applying a sticker function to the output schedule preview screen.

Figure 6B:
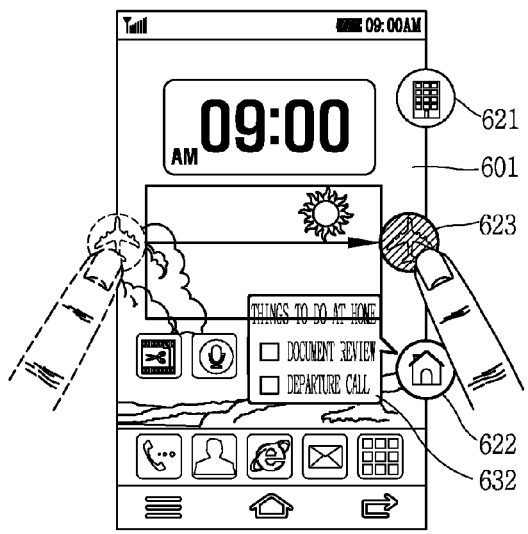
Figure 6D:
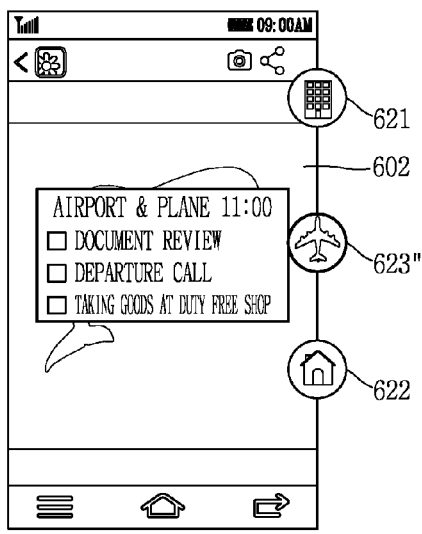
Figure 6C:
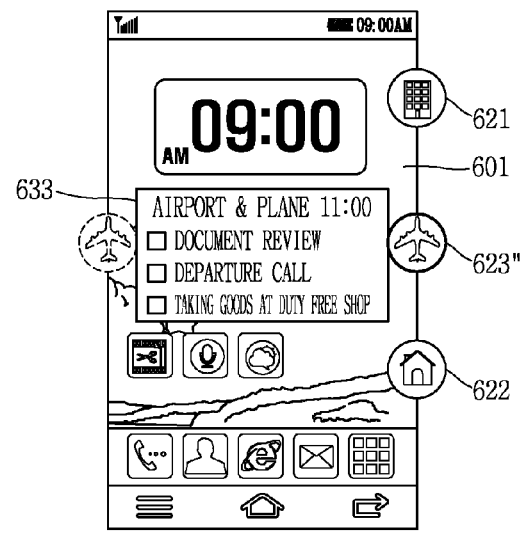

For instance, as shown in FIGS. 6(b) and 6(c), in a state where the schedule preview screen 632 has been output, if a touch input applied to another icon 623 is dragged to one direction, i.e., dragged up to the edge region opposite to the original output position of the icon 623, a schedule preview screen 633 corresponding to the icon 623 gradually appears to cover part of the previously-output schedule preview screen 632.

In this case, an image, of which size is gradually changed according to a path of the drag input, may be generated on the home screen 601. Information on a schedule corresponding to the icon 623 is displayed in the image. As a pinch-out/pinch-in touch input is applied to the fixed schedule preview screen 633 up and down or right and left, a size of the fixed schedule preview screen 633 may be controlled.

Once the schedule preview screen 633 is fixed to the home screen 601, a position of the selected icon 623 is changed into the drag input-released point to thus be fixed, as shown in FIG. 6(c).

Once the selected icon 623 and the schedule preview screen 633 are fixed, the home screen 601 output to the display unit 151 may be changed into another screen 602, and said another screen 602 may be continuously displayed even when said other icons 621 and 622 have disappeared.

A fixed state of the icon 623 and the schedule preview screen 633 may be released when a preset touch input (e.g., a long touch having a duration time more than a reference time, or a long press touch input) is applied to the icon 623. If a reference time lapses, the fixed icon 623 and schedule preview screen 633 disappear from the display unit 151. In this case, an animation effect to roll paper may be applied to the schedule preview screen 633.

A schedule preview screen corresponding to an icon may be automatically popped-up when a specific condition is satisfied.

Figure 7A:
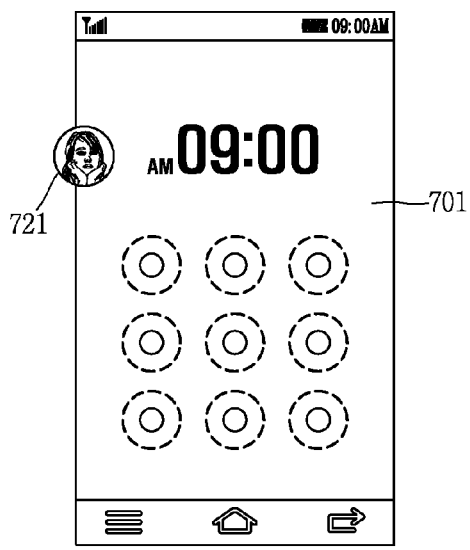
FIGS. 7A(a) to 7B(c) are conceptual views for explaining a method of informing that a mobile terminal according to an embodiment of the present invention approaches a schedule-related position.
Figure 7A:
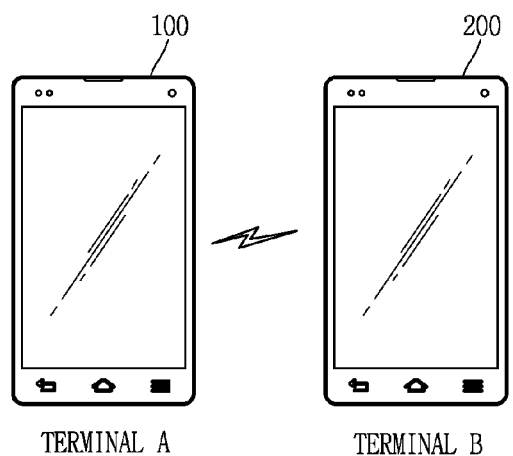
Figure 7A:
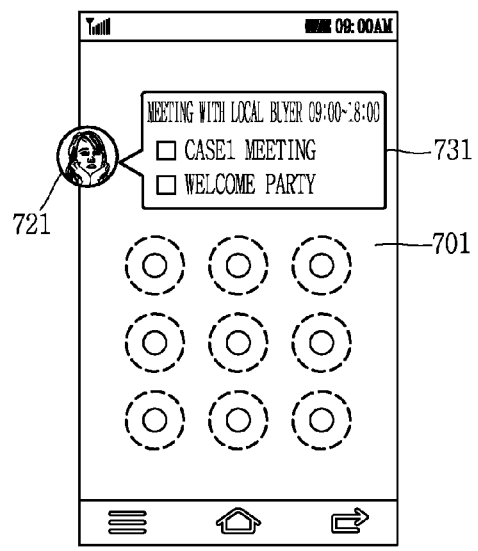

FIGS. 7A(a) to 7A(c) and 7B(a) to 7B(c) are conceptual views for explaining an embodiment where a schedule preview screen is automatically popped-up when the mobile terminal 100 according to an embodiment of the present invention approaches a schedule-related position.

FIGS. 7A(a) to 7A(c) illustrate a method for explaining a method of informing a user that a mobile terminal according to an embodiment of the present invention approaches another mobile terminal related to a schedule.

Referring to FIG. 7A(a), a schedule-related icon 721 may be displayed as another person's facial image related to a schedule. Said another person's facial image may be a facial image pre-stored in an address book of the mobile terminal, a preset facial image, or a facial image selected from an edition mode where the mobile terminal has entered by applying a long touch input to the icon 721.

In another embodiment, in a case where a facial image has been displayed on the schedule-related icon 721, when icons are displayed on the edge region of the display unit 151, the icons may be arranged based on azimuth information of another person's mobile terminal. However, in this case, it is assumed that another person has permitted position-tracking of his or her mobile terminal.

In a case where an image of the floated icon is associated with a schedule-related specific person, the controller 180 may output a corresponding schedule preview screen around the icon, in response to sensing of the specific person's registered terminal within a reference range based on the received position information. Alarm information such as output of a sound, a vibration and a graphic object, may be further output to the mobile terminal.

For instance, as shown in FIG. 7A(b), in a case where the user's mobile terminal 100 and another person's mobile terminal 200 related to a schedule corresponding to the icon 721 are close to each other within a predetermined distance (e.g., a predetermined distance where they can transceive (transmit and receive) Bluetooth (BT) signals), the controller 180 recognizes that the user is with another person related to a schedule corresponding to the icon 721. Then the controller 180 may automatically pop-up things to do on the display unit 151, as shown in FIG. 7A(c). This can allow a user to perform all things to do without forgetting his or her schedules when the user is with a specific person.

Figure 7B:
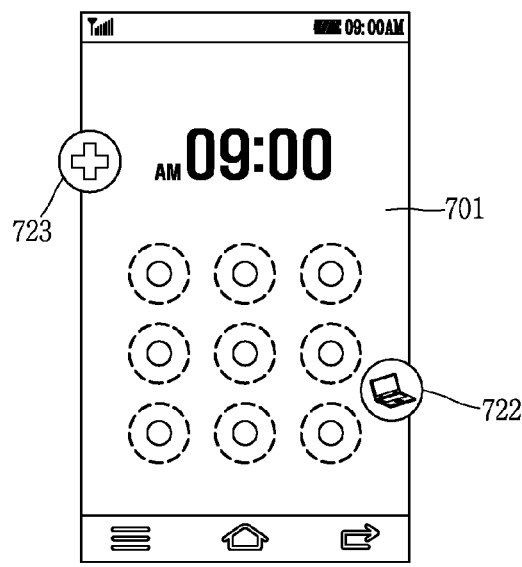
Figure 7B:
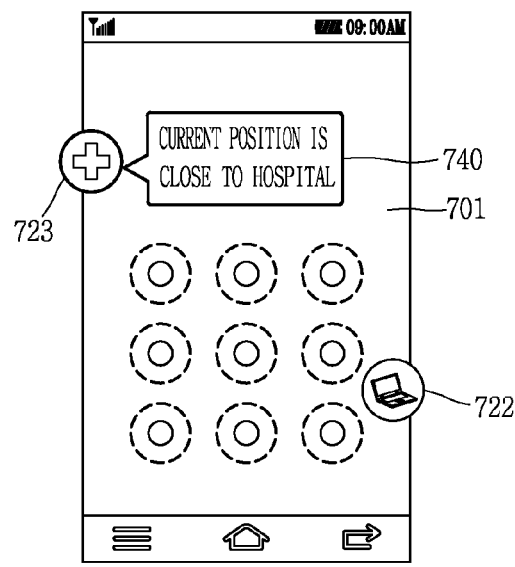
Figure 7B:
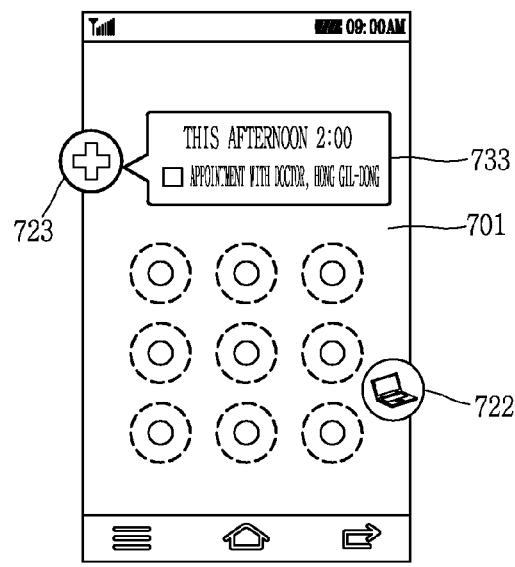

FIGS. 7B(a) to 7B(c) are views illustrating a method of informing a user that the mobile terminal is close to a schedule-related place.

As shown in FIG. 7B(a), icons 722 and 723 floated on the edge region of the display unit 151 indicate only schematic azimuth information related to a schedule. Thus, whether a current position of the mobile terminal is closer to a place corresponding to the first icon 722, or a place corresponding to the second icon 723 can be determined, in a case where a touch input has been applied to an icon.

If a schedule-related position corresponding to an icon floated on the edge region of the display unit 151 is within a reference range (e.g., several tens several meters) based on received position information, the controller 180 may output preset alarm information so as to inform a user of things to do nearby. The alarm information may include at least one of output of a sound, output of a vibration, output of a graphic object, and change of an image of the icon.

For instance, if a current position of the mobile terminal is close to 'XX' hospital corresponding to the icon 723, a message window such as "The current position is close to 'XX' hospital" may be popped-up on the display unit 151 as shown in FIG. 7B(b). If a predetermined time lapses or a current position of the mobile terminal is closer to the 'XX' hospital, a schedule preview screen 733 corresponding to the icon 723 may be output as shown in FIG. 7B(c). This can allow a user to efficiently change a schedule with consideration of a traffic line (moving line), even before a scheduled time.

Hereinafter, a method of executing a schedule-related application by applying a touch input to an icon, in a locked state of the mobile terminal will be explained with reference to FIGS. 8(a) to 8(c).

Figure 8A:
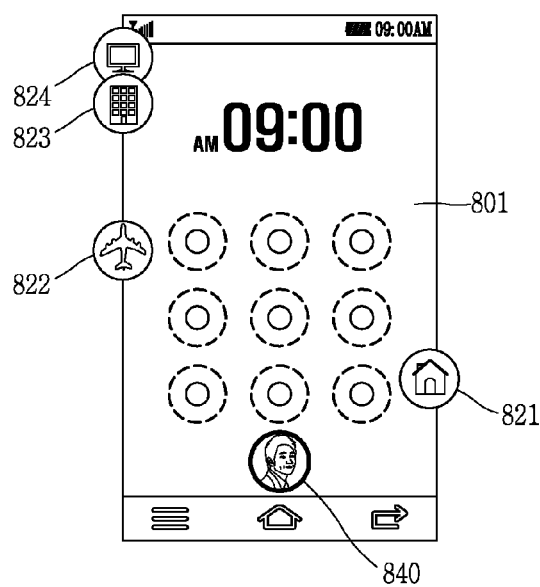
FIGS. 8(a) to 8(c) illustrate conceptual views for explaining a method of executing a schedule-related application in a locked state of a mobile terminal according to an embodiment of the present invention.

As shown in FIG. 8(a), once the display unit 151 of the mobile terminal 100 is turned on, a lock screen 801, corresponding to a locked state where input of a control command with respect to an application is restricted, may be output. A plurality of schedule-related icons 821, 822, 823 and 824 may be floated on the edge region of the display unit 151, on points indicating schedule-related places.

A profile icon 840, which indicates position information of the mobile terminal received through the wireless communication unit 110, may be output to a preset region of the lock screen, e.g., a central region of a lower end (or a lower side of a locked-state releasing region). In this case, the schedule-related icons 821, 822, 823 and 824 may be arranged based on a position of the profile icon 840 and pre-obtained azimuth information, rather than the home key 130a aforementioned with reference to FIG. 4(c).

An image of the profile icon 840 may be displayed as a user's pre-registered facial image. Alternatively, as aforementioned, the image of the profile icon 840 may be an image selected from an edition mode where the mobile terminal has entered by applying a long touch input to the icon 840. Text information (not shown) indicating a current position of the mobile terminal, and information (not shown) on the number of next schedules may be displayed around the profile icon 840. A touch input may be applied to the profile icon 840.

If a drag touch input applied to the profile icon 840 is released from the icon floated on the edge region of the display unit 151, the controller 180 may convert a locked state of the mobile terminal into a released state, and may output an execution screen of an application corresponding to the selected icon to the display unit 151.

A current position of the mobile terminal, which corresponds to the profile icon, and a graphic object (e.g., path guide image) indicating a schedule-related position corresponding to the selected icon may be displayed on the execution screen.

Figure 8B:
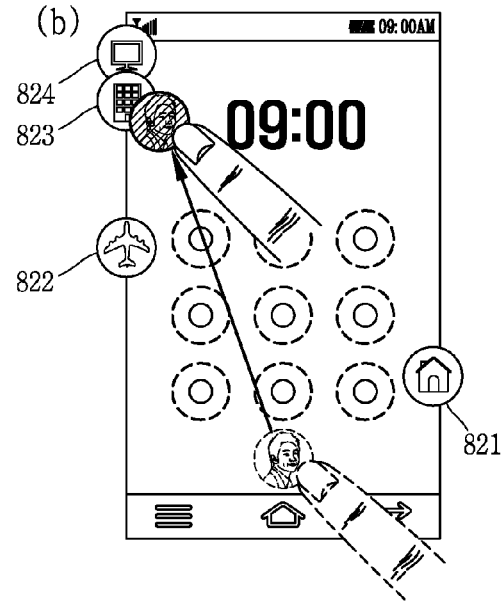
Figure 8C:
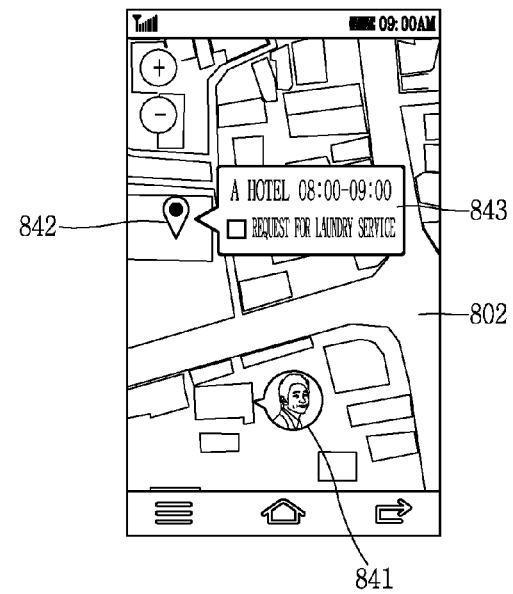

For instance, if a touch input applied to the profile icon 840 is dragged to the floated icon 823 as shown in FIG. 8(b), the controller 180 releases a locked state of the mobile terminal and then outputs an execution screen of a map application, in order to provide detailed information on a schedule in a hotel related to the icon 823 as shown in FIG. 8(c). A first graphic object 841 indicating a current position of the mobile terminal, a second graphic object 842 indicating a position of a hotel, and a pop-up window 843 indicating things to do at a hotel, are output to a map screen 802. If a user presses a back button, a home screen may be output to the display unit 151.

In the present invention, a user may be provided with detailed information on schedule content or schedule-related positions, even in a locked state of the mobile terminal.

So far, it has been explained that schedule-related icons are displayed on the edge region of the display unit 151 in a position-based manner. Hereinafter, various examples to display schedule-related icons on the edge region of the display unit 151 in a time-based manner will be explained in more detail with reference to FIGS. 9A(a) to 9C(e).

The mobile terminal 100 according to the present invention may further receive time information with respect to the terminal body, through the wireless communication unit 110. The wireless communication unit 110 may receive information on current time, from a base station.

FIGS. 9A(a) and 9A(b) illustrate an embodiment where schedule-related icons have been displayed on the edge region of the display unit 151 in a time-based manner.

The controller 180 may extract one or more schedules stored in the terminal body, and may calculate a remaining time until a scheduled time with respect to the extracted schedule, based on time information received through the wireless communication unit 110. The controller 180 may output icons related to the extracted schedules to the edge region of the display unit, based on the calculated remaining time. For instance, if a remaining time until a scheduled time based on a current time is comparatively long, the controller 180 arranges the icon on a position far from a predetermined point on the edge region. On the other hand, if a remaining time until a scheduled time based on a current time is comparatively short, the controller 180 arranges the icon on a position close to the predetermined point on the edge region.

Referring to FIG. 9A(a), the predetermined point may be one of two lower edge regions. If a calculated remaining time is comparatively short, the controller 180 arranges the icon on a position close to the lower edge region. On the other hand, if a calculated remaining time is comparatively long, the controller 180 arranges the icon on a position far from the lower edge region, i.e., a position close to one of two upper edge regions.

The controller 180 may control schedule-related icons to move to a preset direction along the edge region of the display unit 151, as time lapses, i.e., in response to change of received time information. FIG. 9A(a) illustrates that schedule-related icons 921, 922, 923 and 924 move downward toward a reference time line on the display unit 151, as time lapses. However, the present invention is not limited to this. That is, the schedule-related icons 921, 922, 923 and 924 may rotate to other direction (e.g., upper, clockwise or counterclockwise direction).

For this, as shown in FIG. 9A(a), a reference time line informing a current time may be set to two lower edge regions of the display unit 151. The reference time line may be displayed on the display unit 151 as a straight line, or may not be displayed as a virtual line. In this case, the schedule-related icons 921, 922, 923 and 924 are not displayed based on azimuth information, but are displayed on a left edge region or a right edge region of the display unit 151. As time lapses, the schedule-related icons 921, 922, 923 and 924 are gradually downward moved.

That is, the controller 180 may control the schedule-related icons to move toward a reference time line along the edge region of the display unit 151, according to a changed degree of received time information.

Moving speeds of the schedule-related icons 921, 922, 923 and 924 of FIG. 9A(a) toward the reference time line may be different from each other. That is, a moving speed of a schedule-related icon may be variable according to a remaining time until a corresponding schedule is executed, an importance of a schedule, etc. For instance, if remaining times until scheduled times corresponding to a plurality of icons overlapped with each other on the same position are different from each other, the overlapped icons may be separated from each other as time lapses. As another example, if a remaining time until a corresponding schedule is executed is short (e.g., 30 minutes or less), the mobile terminal may move more rapidly than before.

In a case where an icon 921 is overlapped with the reference time line partially or wholly, the controller 180 may recognize that it's time to execute a schedule corresponding to the icon 921. Thus, the controller 180 may output an alarm indicating a schedule corresponding to the icon 921 overlapped with the reference time line. If a reference time (e.g., 5 seconds) lapses or the icon 921 has completely passed through the reference time line, the controller 180 may control the icon 921 to disappear from the display unit 151.

In a state where the icon 921 has been partially or wholly overlapped with the reference time line on the display unit 151, if a touch input applied to the icon 921 is dragged to a direction to become distant from the reference time line, the controller 180 may change a scheduled time of the dragged icon 921.

As a result, as shown in FIG. 9A(b), the icon 921 is moved to a drag-released point (921"). Then guide information indicating a changed schedule, i.e., a message indicating a delayed time (e.g., a schedule has been delayed by 30 minutes.) (950) is popped-up around the icon 921".

If a user wishes to advance a scheduled time, the user has only to drag touch inputs applied to the schedule-related icons 921, 922, 923 and 924, to a direction close to the reference time line. In this case, a scheduled time is advanced in proportion to a dragged length and a remaining time until the scheduled time. Guide information similar to that shown in FIG. 9A(b) may be popped-up on the display unit 151.

Figure 9B:
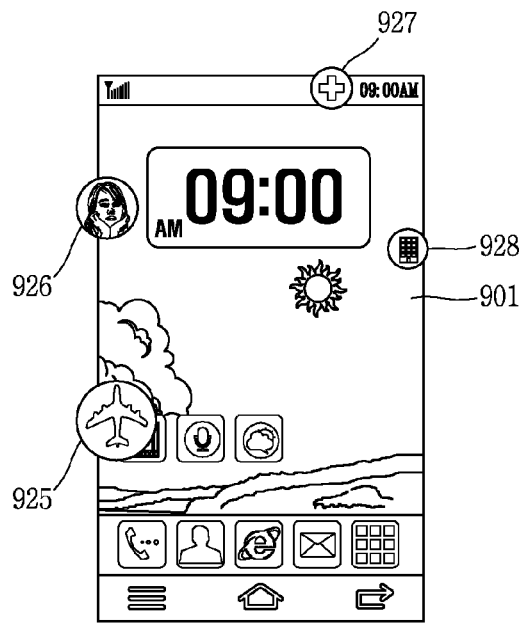
FIGS. 9A(a) to 9C(e) are conceptual views for explaining a method of displaying schedule-related icons according to time, in a mobile terminal according to an embodiment of the present invention.
Figure 9B:
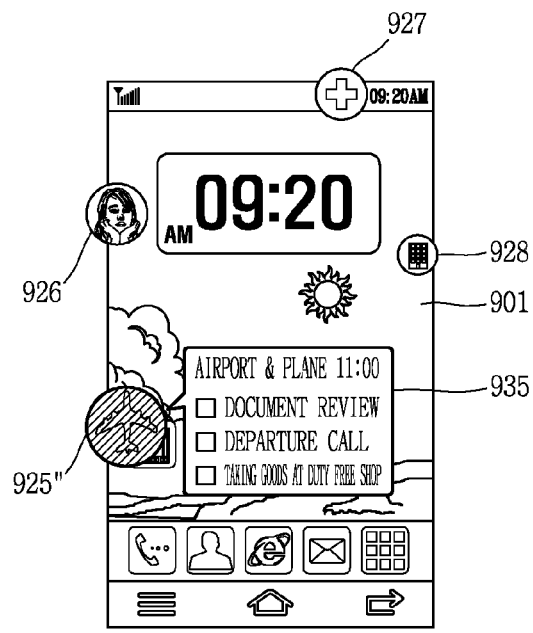
Figure 9B:
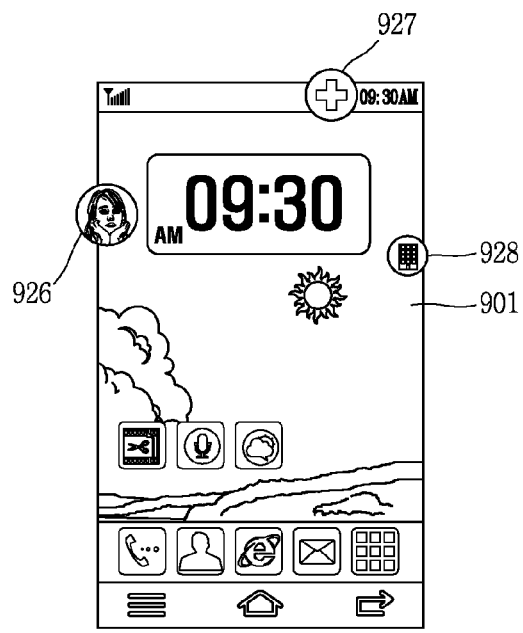

FIGS. 9B(a) to 9B(c) and 9C(a) to 9C(e) are views illustrating embodiments where a time concept is applied to schedule-related icons arranged in a position-based manner.

Referring to FIG. 9B(a), floated icons 925, 926, 927 and 928 are displayed on the edge region of the display unit 151 in different sizes. The icons 925, 926, 927 and 928 are displayed on an upper end, a lower end, a right edge region and a left edge region, since they are arranged based on azimuth information unlike in FIGS. 9A(a) and 9A(b).

For this, the controller 180 may calculate remaining times until scheduled times corresponding to the icons 925, 926, 927 and 928, based on time information received through the wireless communication unit 110. The controller 180 may control the floated icons to have different sizes based on the calculated remaining times. In this case, the controller 180 may gradually increase a size of the icon as time lapses, so that a user can intuitively recognize that a scheduled time is near at hand. An increased degree of the size of the icon may be variable according to a remaining time until a scheduled time, based on a current time.

For instance, as shown in FIG. 9B(a), the first icon 925 has been displayed in a largest size, since a remaining time until a scheduled time is short. On the contrary, the third and fourth icons 927 and 928 have been displayed in a small size, since a remaining time until a scheduled time is long.

As shown in FIG. 9B(b), the first icon 925 is increased to a largest size, and a schedule preview screen 935 is automatically output when a scheduled time is near at hand. Alarm information such as a vibration and a sound may be further output so that a user can recognize that the current time is a scheduled time. When a reference time (e.g., 1 minute) lapses, the schedule preview screen 935 disappears from the display unit 151 as shown in FIG. 9B(c). The icons 925, 926, 927 and 928 move along the edge region of the display unit 151 when azimuth information on schedule-related places are changed based on a current position of the mobile terminal.

FIGS. 9C(a) to 9C(e) are views illustrating that a time concept is applied as movement of icons, like a position concept. As shown in FIG. 9C(a), icons 929 and 930 arranged on the edge region of the display unit 151 may be further provided with arrow images indicating azimuth information on schedule-related positions. A graphic object 941 indicating a current position of the mobile terminal, and information 942 indicating the number of schedules to be performed may be displayed around a profile icon 940. A virtual horizontal straight line may be set as a reference time line, based on a point where the profile icon 940 has been arranged.

Under an assumption that the current position of the mobile terminal is not changed in such a state, the icons 929 and 930 move toward the profile icon 940 as time lapses, based on remaining times until scheduled times. In this case, the first icon 929 having a shorter remaining time than the second icon 930 until a scheduled time may move faster than the second icon 930.

As the first icon 929 is downward moved, as shown in FIG. 9C(b), the arrow image included in the first icon 929 may clockwise rotate so as to continue to indicate the original direction.

Referring to FIG. 9C(c), if the first icon 929 becomes close to the profile icon 940 within a predetermined range (e.g., 30 minutes based on a calculated remaining time, or 3~5 cm based on a spaced distance), a keyword window 960 (e.g., 'application conference') indicating a schedule corresponding to the first icon 929 is popped-up around the first icon 929. Thus, a user can check a schedule to be executed a little later, without an additional manipulation. A color of the first icon 929 may be changed, or an emphasizing effect such as flickering may be applied to the first icon 929.

If a touch input is applied to the first icon 929 under such state, a schedule preview screen 939 is output as shown in FIG. 9C(d). If a touch input is applied to the keyword window 960, a menu screen 970 including schedule-related messages 971, 972 and 973 to be sent to another person and a call making icon 974 is popped-up around the first icon 929 as shown in FIG. 9C(e). In this case, a user can send a message or make a call to a schedule-related another party. Accordingly, a user's convenience can be enhanced.

Figure 10A:
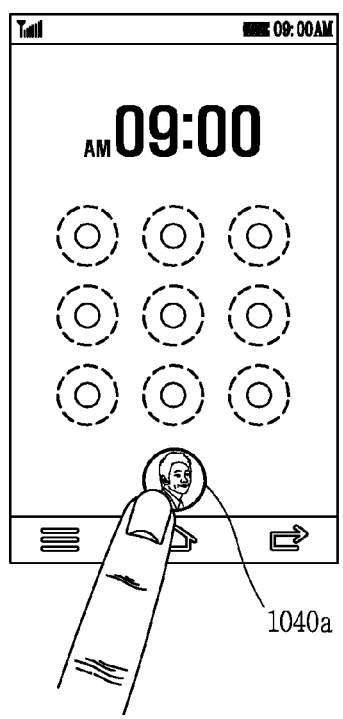
FIGS. 10(a) to 10(c) illustrates conceptual views for explaining how to change a method of displaying schedule-related icons in a time or position-based manner, into a method of displaying schedule-related icons in a position or time-based manner, in a mobile terminal according to an embodiment of the present invention.
Figure 10B:
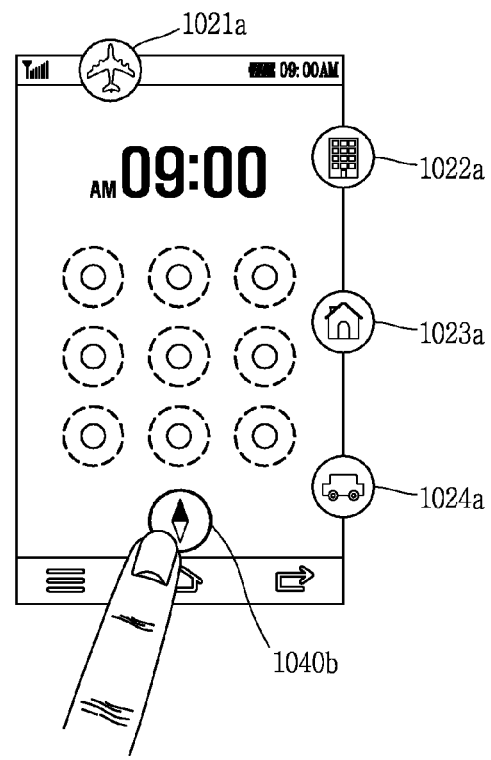
Figure 10C:
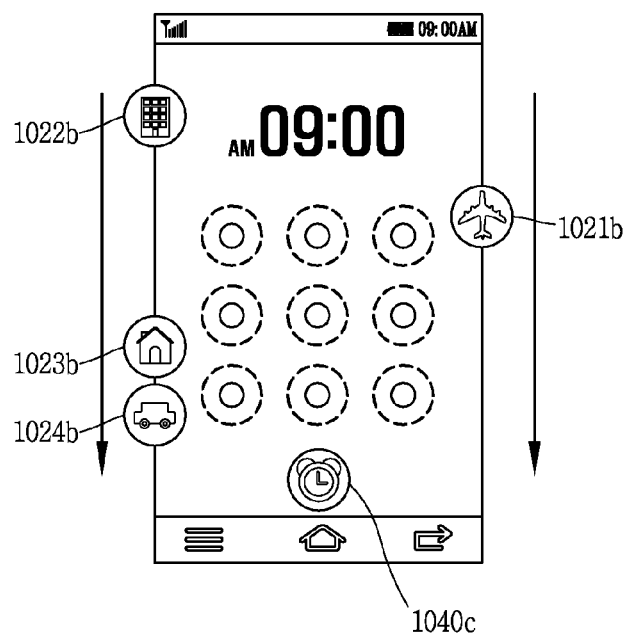

FIGS. 10(*a*) to 10(*c*) illustrate conceptual views for explaining how to change a method of displaying schedule-related icons in a position or time-based manner, into a method of displaying schedule-related icons in a time or position-based manner, according to a user's selection.

As shown in FIG. 10(*a*), if the display unit 151 is converted into an 'ON' state from an 'OFF' state, a lock screen corresponding to a locked state of the mobile terminal, or a home screen may be output to the display unit 151. A profile icon 1040*a* may be popped-up on a lower region of the display unit 151. An image of the profile icon 1040*a* may be a preset facial image, or an image selected in an edition mode where the mobile terminal has entered by applying a touch input to the icon 1040*a*. Once the profile icon 1040*a* is popped-up, position information of the mobile terminal may be received, and information on schedules stored in the mobile terminal may be extracted. However, schedule-related icons are not output.

Under this state, if a touch input (e.g., a single touch input or a tab) is applied to the popped-up profile icon 1040*a*, icons are arranged on the edge region of the display unit 151, based on azimuth information of schedule-related icons (or in a position-based manner), at a time point when the applied touch input has been released. As a result, as shown in FIG. 10(*b*), a plurality of icons 1021*a*, 1022*a*, 1023*a* and 1024*a* are floated on the edge region of the display unit 151, and the profile icon 1040*a* is changed into an image 1040*b* indicating azimuth information.

Once a touch input (e.g., a single touch input or a tab) is re-applied to the profile icon 1040*b*, schedule-related icons are rearranged on the edge region of the display unit 151 based on time information, at a time point when the applied touch input has been released. As a result, as shown in FIG. 10(*c*), a plurality of icons 1021*b*, 1022*b*, 1023*b* and 1024*b* are floated on right and left edge regions of the display unit 151, and the image 1040*b* is changed into an image 1040*c* indicating time information.

That is, the profile icon is changed into a different image, as an arrangement method of schedule-related icons is changed from a manner based on one of azimuth information and calculated time information, to a manner based on another. The different image may be an image related to an arrangement method of schedule-related icons.

Once a touch input (e.g., a single touch input or a tab) is re-applied to the image 1040*c*, as shown in FIG. 10(*a*), the original profile icon 1040*a* may appear and the schedule-related icons which have been output to the edge region of the display unit 151 may disappear.

Figure 11A:
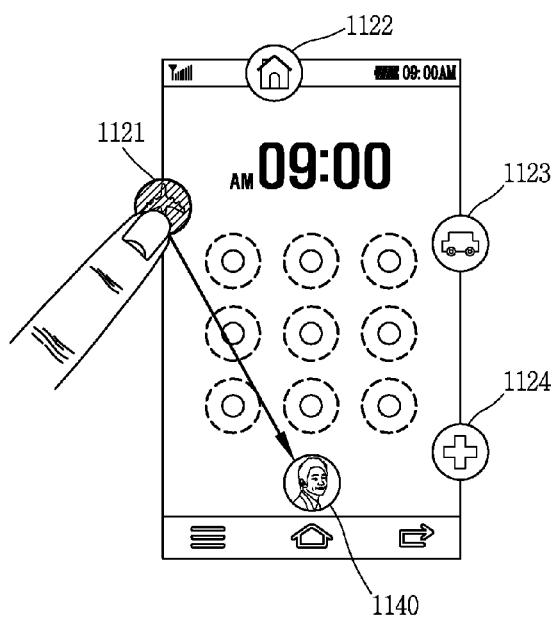
FIGS. 11A(a) to 11B(c) are conceptual views for explaining a method of executing a function to view schedule-related icons in an overlapped manner, and a function to view schedule-related icons in a scattered manner, in a mobile terminal according to an embodiment of the present invention.
Figure 11A:
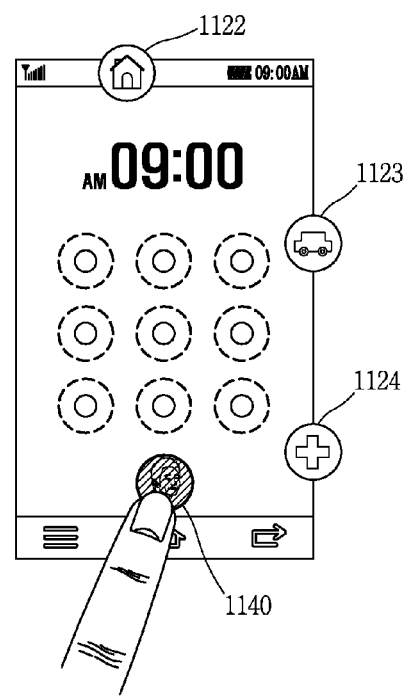
Figure 11A:
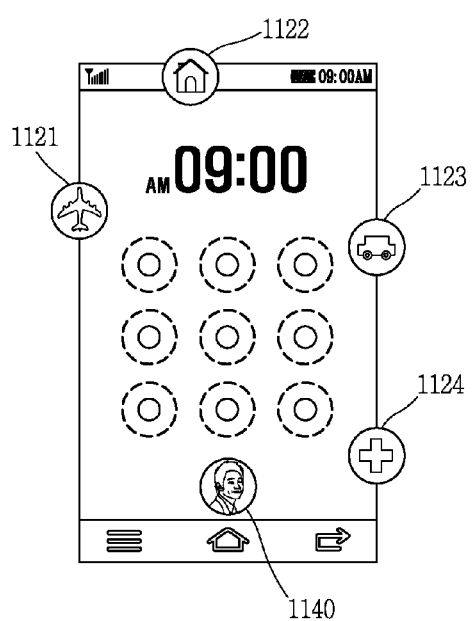

FIGS. 11A(a) to 11A(c) and 11B(a) to 11B(c) are conceptual views for explaining a method of executing a function to view schedule-related icons in an overlapped manner, and a function to view schedule-related icons in a scattered manner, in a mobile terminal according to an embodiment of the present invention.

Once a large number of icons are displayed on the edge region of the display unit 151, the display unit 151 has a complicated screen. The controller 180 may control a schedule-related icon checked by a user, to disappear from the display unit 151.

As shown in FIG. 11A(a), if a touch input applied to an icon 1121 is dragged to a profile icon 1140 to thus be released, the controller 180 recognizes that a user has checked a corresponding schedule, and controls the icon 1121 to disappear as shown in FIG. 11A(b). If a long touch input is applied to the profile icon 1140 under this state, the controller 180 recognizes that the user wishes to view a checked schedule again, and controls the disappeared icon 1121 to be output to the original position as shown in FIG. 11A(c).

Figure 11B:
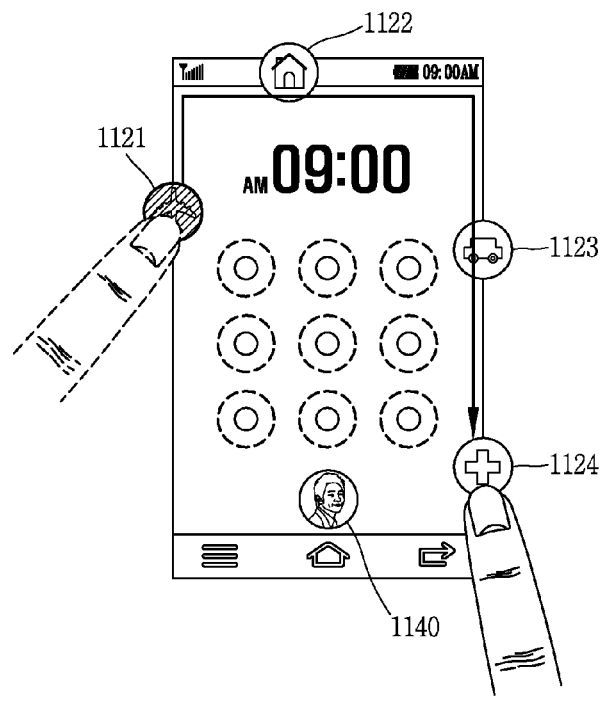
Figure 11B:
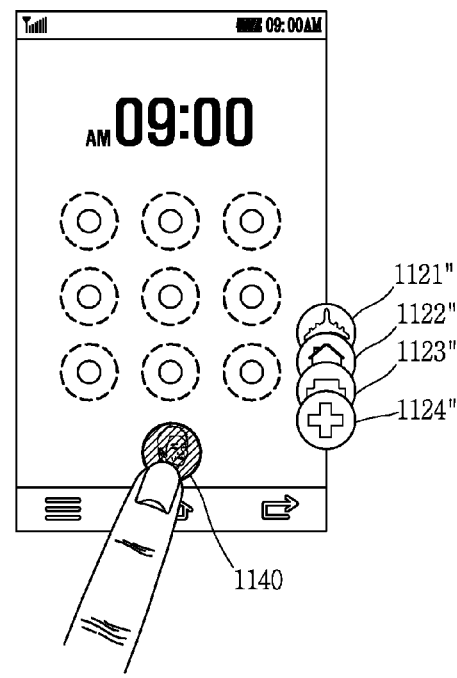
Figure 11B:
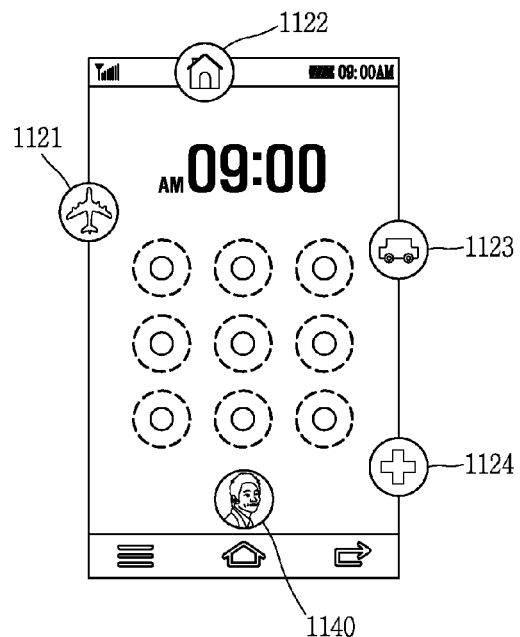

As another example, as shown in FIG. 11B(a), if a touch input starting from the first icon 1121 is dragged to a fourth icon 1124, via a plurality of icons 1122 and 1123, to thus be released, the first to fourth icons 1121, 1122, 1123 and 1124 are overlapped with each other on one point. In this case, an icon displayed on an uppermost side may be the first icon 1121 to which the touch input has been firstly applied, the fourth icon 1124 positioned on the touch-released point, or an icon corresponding to a schedule to be executed most recently. An icon related to an urgent schedule may be separately displayed on an upper end of the display unit, without being overlapped with other icons.

If a pinch-out touch input is applied to the overlapped icons, the overlapped icons may be separated from each other. Alternatively, if a touch input is applied to the profile icon 1140 as shown in FIG. 11B(b) and (c), the overlapped icons 1121, 1122, 1123 and 1124 may be separated from each other.

So far, have been explained embodiments to output icons related to schedules stored in the mobile terminal to the edge region of the display unit 151. However, icons may be generated based on other information stored in the mobile terminal, and the generated icons may be floated on the edge region of the display unit 151. For instance, photo images stored in an album of the mobile terminal may be floated on the edge region of the display unit 151, based on azimuth information on a position captured based on a current position of the mobile terminal.

The mobile terminal according to an embodiment of the present invention, and the control method thereof can have the following advantages.

Firstly, the mobile terminal of the present invention may output schedule-related icons to the edge region of the display unit, by acquiring azimuth information about positions related to schedules stored in the mobile terminal, based on a current position of the mobile terminal. Especially, as the schedule-related icons floated on the edge region of the display unit move based on azimuth information changed whenever a gradient of the mobile terminal is changed, azimuths of schedule-related positions are intuitively displayed. Further, a user may be immediately provided with schedule content or schedule-related positions even in a locked state of the mobile terminal, by using a touch input applied to an icon. Accordingly, the user needs not perform a plurality of procedures for checking content, positions and times with respect to schedules stored in the mobile terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display;
a memory;
a wireless communication unit configured to receive position information related to a current location of the mobile terminal; and
a controller configured to:
identify an azimuth between a location associated with a schedule stored in the memory, and the current location and orientation of the mobile terminal;
cause the display to display an icon corresponding to the schedule according the identified azimuth, wherein a displayed location of the icon within the display corresponds to the location associated with the schedule relative to the current location and the orientation of the mobile terminal;
cause the display to change the displayed location of the icon according to changes in the current location of the mobile terminal; and
cause the display to change the displayed location of the icon according to changes in the orientation of the mobile terminal.

2. The mobile terminal of claim 1, wherein the controller is further configured to cause the display to display a schedule preview screen corresponding to the displayed icon in response to a touch input received with respect to the displayed icon.

3. The mobile terminal of claim 1, wherein:
an image of the displayed icon comprises at least the location associated with the schedule, a person related to the schedule, or time associated with the schedule; and
the controller is further configured to cause the display to display a plurality of icons for a plurality of schedules such that a number of the plurality of icons corresponds to a number of the plurality of schedules.

4. The mobile terminal of claim 1, wherein the controller is further configured to cause the display to:
display a lock screen corresponding to a locked state; and
display the icon within an edge portion of the lock screen.

5. The mobile terminal of claim 4, wherein the controller is further configured to cause the display to display a menu for executing at least one function associated with the schedule corresponding to the icon at a specific location of the lock screen when a drag touch input applied to the icon is released at the specific location of the lock screen.

6. The mobile terminal of claim 5, wherein the controller is further configured to:
cause the mobile terminal to transition from the locked state to an active state in response to a touch input applied to a menu item of the menu displayed on the lock screen; and
execute a function corresponding to the menu item with respect to the schedule corresponding to the icon.

7. The mobile terminal of claim 1, wherein the controller is further configured to cause the display to display a schedule preview screen related to the schedule corresponding to the displayed icon in response to a drag input applied to the displayed icon such that at least a size of the displayed schedule preview screen is determined according to a length of the drag input.

8. The mobile terminal of claim 1, wherein:
an image of the displayed icon is associated with a specific person associated with the schedule corresponding to the displayed icon; and
the controller is further configured to cause the display to display a schedule preview screen corresponding to the schedule near the displayed icon when a terminal registered to the specific person is within a threshold distance with respect to the mobile terminal.

9. The mobile terminal of claim 1, wherein the controller is further configured to:
cause the display to display a lock screen corresponding to a locked state;
cause the display to display a profile icon representing the received position information at a predetermined location on the lock screen; and
arrange the icon displayed within an edge portion of the lock screen with respect to the displayed profile icon based on the identified azimuth.

10. The mobile terminal of claim 9, wherein the controller is further configured to:
transition the mobile terminal from the locked state to an active state in response to a drag touch input applied to the profile icon, the drag touch input released at the displayed icon;
cause the display to display an execution screen of an application corresponding to the icon in the active state; and
cause the display to display the profile icon indicating the current location of the mobile terminal and a graphic object indicating the location associated with the schedule corresponding to the icon on the execution screen.

11. The mobile terminal of claim 9, wherein the controller is further configured to cause the display to display the icon within the edge portion of the lock screen in response to a touch input applied to the profile icon displayed on the lock screen.

12. The mobile terminal of claim 9, wherein the controller is further configured to:
- identify time information; and
- control the display such that the displayed location of the icon is changed toward a side on which the profile icon is displayed according to changes in the identified time information.

13. The mobile terminal of claim 12, wherein the controller is further configured to cause the display to:
- re-arrange the icon based on the azimuth in response to a first input applied to the profile icon; and
- re-arrange the icon based on the time information in response to a second input applied to the profile icon while the icon re-arranged in response to the first input is displayed.

14. The mobile terminal of claim 13, wherein the controller is further configured to cause the display to display:
- a first image in the profile icon in response to the first input, the first image representing the azimuth; and
- a second image in the profile icon in response to the second input, the second image representing the time information.

15. The mobile terminal of claim 1, wherein the controller is further configured to:
- identify time information; and
- control a size of the displayed icon according to the time information and time associated with the schedule.

16. The mobile terminal of claim 1, wherein the displayed location is within an edge portion of the display.

17. A mobile terminal, comprising:
- a display;
- a memory; and
- a controller configured to:
  - cause the display to display an icon corresponding to a schedule stored in the memory according to current time information and time associated with the schedule, wherein a displayed location of the icon within the display corresponds to the time associated with the schedule relative to the current time information; and
  - cause the display to change the displayed location of the icon according to changes in difference between the current time information and the time associated with the schedule;
- wherein the displayed location is within an edge portion of the display; and the controller is further configured to control the display such that the displayed icon appears to move along the edge portion toward a reference time line set on the display.

18. The mobile terminal of claim 17, wherein the controller is further configured to:
- cause output of an alarm when the displayed icon reaches the reference time line; and
- cause the display to stop displaying the icon after outputting the alarm for a predetermined period of time.

19. The mobile terminal of claim 18, wherein the controller is further configured to:
- change the time associated with the schedule that corresponds to the displayed icon from first time to second time in response to a touch input applied to the icon that reached the reference time line, dragging of the touch input-applied icon in a second direction that is generally an opposite direction of the first direction, and releasing of the dragged icon at a point on the display; and.
- cause the display to display guide information indicating the changed time in response to the releasing of the dragged icon.

\* \* \* \* \*